Patented Aug. 23, 1932

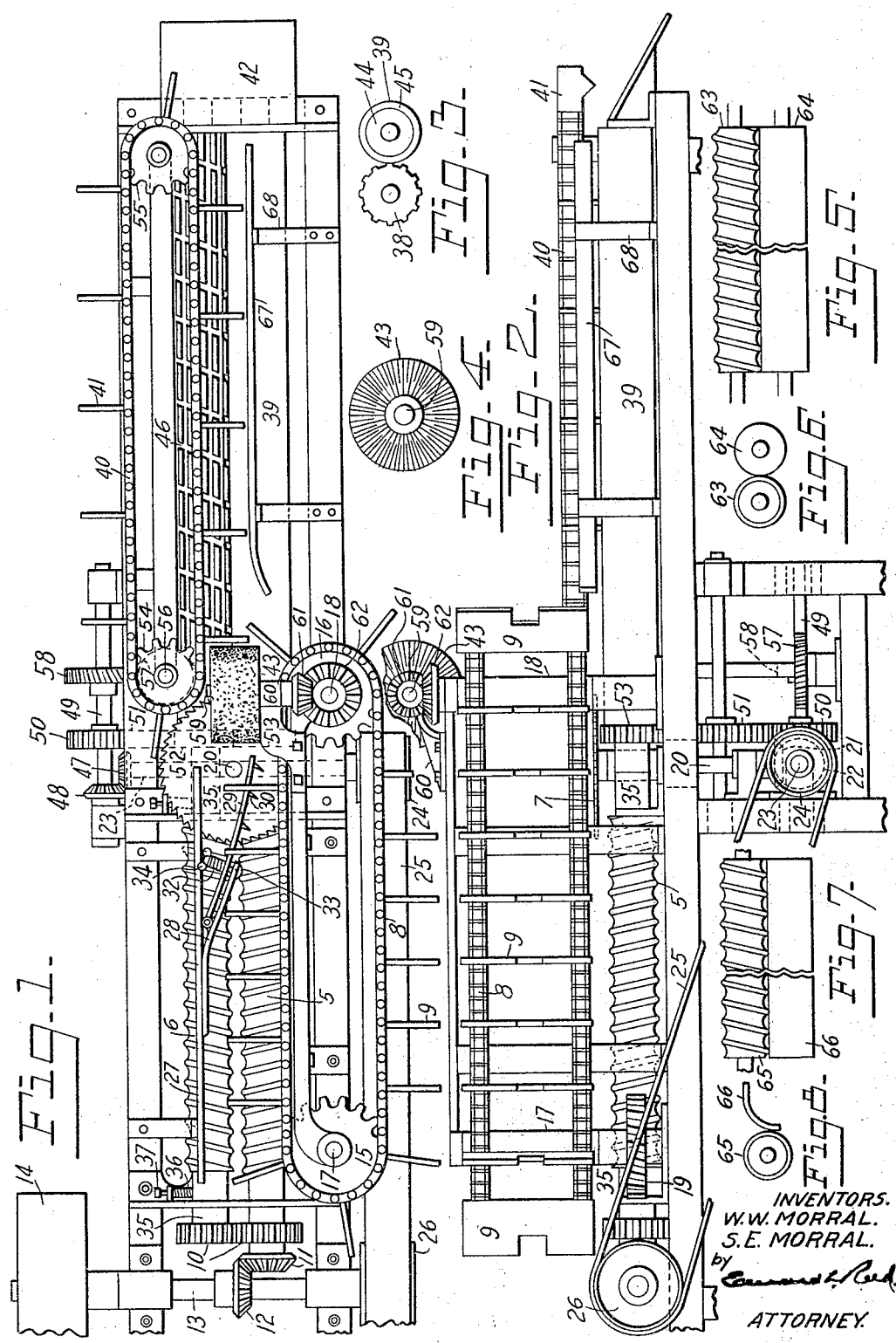

1,873,455

UNITED STATES PATENT OFFICE

WILLIAM W. MORRAL AND SAMUEL E. MORRAL, OF MORRAL, OHIO

BUTT REMOVING AND HUSKING MECHANISM FOR GREEN CORN

Application filed February 29, 1928. Serial No. 257,827.

This invention relates to a butt removing and husking mechanism for green corn.

One object of the invention is to provide a combined butt removing and husking mechanism having separate conveyors for the butt removing mechanism and for the husking mechanism, said conveyors being so arranged with relation one to the other that the conveyor for the husking mechanism will engage the ear as it is discharged from the conveyor for the butt removing mechanism and move the same into engagement with and along the husking rollers.

A further object of the invention is to provide such a mechanism which will be simple in its construction and operation and which may be produced at a relatively low cost.

A further object of the invention is to provide a mechanism of this kind with husking rollers which will more effectually remove the silk from ears of corn.

A further object of the invention is to provide a butt removing device having spiral gaging rollers one of which is yieldable with relation to the other to accommodate the rollers to ears of different thickness.

A further object of the invention is to provide a butt removing device having an improved husk loosening device.

Other objects of the invention will appear as the device is described in detail.

In the accompanying drawing Fig. 1 is a plan view, partly broken away, of a mechanism embodying the invention; Fig. 2 is a side elevation, partly broken away, of such a mechanism; Fig. 3 is an end elevation of the husking rollers; Fig. 4 is an end elevation of the brush for positioning the ears on the husking rollers; Fig. 5 is a plan view of a modified gaging device; Fig. 6 is an end view of the gaging device of Fig. 5; Fig. 7 is a plan view of another modification of the gaging device; and Fig. 8 is an end view of the gaging device of Fig. 7.

In the drawing we have illustrated one embodiment of the invention, together with some minor modifications thereof, and it will be understood that these embodiments have been chosen for the purpose of illustration only and that the mechanism may take various forms without departing from the spirit of the invention. As shown in Figs. 1 to 4 the mechanism comprises a butt removing device having two spiral gaging rollers, 5 and 6, rotatable about parallel axes arranged in a substantially horizontal plane and adapted to receive between them the stem and butt end of an ear of corn, which is supported in an upright position, and to advance the butt of the ear along the rollers toward a cutter 7 which is arranged adjacent to the discharge end of the gaging rollers. A conveyor is provided for moving the upper ends of the ears forwardly as the butts are advanced by the gaging rollers and this conveyor, as here shown, comprises a pair of sprocket chains 8 provided with vertically arranged lateral projections or flights 9 which project over the space between the two gaging rollers and engage the ears for substantial portions of their length, the movement of the endless conveyor and of the gaging rollers being so timed that the ears will be maintained in upright positions. In the present construction, the gaging rollers are connected one to the other by means of spur gears 10 secured to the ends thereof and one of the rollers has secured thereto a beveled gear 11 which meshes with a beveled gear 12 on a drive shaft 13 which is provided with suitable means for connecting the same with a source of power, such as a belt pulley 14. The sprocket chains for the endless conveyors extend about sprocket wheels 15 and 16 mounted respectively on shafts 17 and 18. One of the shafts, in the present instance, the shaft 17, has secured thereto a worm gear 19 which meshes with the spirals on the gaging roller 5 so that the shaft is rotated by the gaging roller and the endless conveyor is caused to move at a speed which is fixed with relation to the speed of the gaging rollers.

The cutter 7 is here shown as a horizontal rotary cutter and is carried by a shaft 20, the lower end of which is provided with a bevel gear 21 which meshes with a beveled gear 22 on a transverse shaft 23. A pulley 24 is secured to the shaft 23 and is connected by a belt 25 with a pulley 26 on the drive shaft 13.

A guide bar 27 extends lengthwise of the gaging rollers, above the same, and is so arranged with relation to the ends of the flights 9 of the conveyor which are above the gaging rollers, that the ears of corn will be retained between the respective flights and thus maintained in substantially vertical positions. Means are provided for pressing the ear against the conveyor and holding the same firmly in position during the cutting operation and also for loosening the husk to facilitate the engagement thereof by the husking rollers. For this purpose we have secured to the guide bar 27 a bracket 28 which has a portion extending at an acute angle from the guide bar, and pivotally mounted upon this bracket is a yieldable bar 29 having near the end thereof prongs or teeth 30 to engage the husks of the ear and tear or loosen the same. The movement of the bar 29 about its axis is resisted by a spiral spring 32 which is coiled about a bolt 33 extending through the bracket 28 and bar 29 and having at its outer end a nut 34 by means of which the tension of the spring may be regulated.

In order that the gaging rollers may accommodate themselves to ears of different thicknesses, and thus insure the removal of the entire butt without cutting away any of the ear, the gaging roller 6 is laterally yieldable with relation to the gaging roller 5. To this end the roller is mounted in bearings 35 which are slidably mounted so that they may move toward and from the roller 5, the outward sliding movement being resisted by spiral springs 36 mounted on bolts 37. The teeth of the gears 10 are of sufficient depth to permit of the necessary movement of the roller 6 without disengaging the two gears.

Arranged beyond the butt removing device is a pair of husking rollers 38 and 39 adapted to receive the ears of corn after the butts have been removed therefrom and to remove the husks from the ear. Arranged above the husking rollers is an endless conveyor 40 having laterally extending flights 41 to engage the ears, move them lengthwise of the husking rollers and discharge them to a chute 42. The flights of this conveyor are spaced apart such distances that they will receive between them the ears in lengthwise position. Extending parallel with the conveyor is a guide bar 67 which is supported by brackets 68 and which serves to retain the ears in proper position with relation to the husking rollers. The husking conveyor 40 is so arranged with relation to the conveyor 8 of the butt removing device that the flights of the two conveyors will intermesh near their adjacent ends, thus causing the flights 41 of the husking conveyor to extend between adjacent flights of the conveyor for the butt removing device and to engage the ears as they are discharged from that conveyor and move them onto the husking rollers. It is preferable that the ears should move along the husking rollers with the pointed ends thereof foremost and means are provided for causing the ears to assume a position on the husking rollers as they are moved onto the same by the conveyor 40. Preferably this means is in the form of a brush 43 so arranged above the conveyor of the butt removing device, near the discharge end thereof, that it will engage the upper ends or tips of the ears and tilt the same forwardly as the ear is moved onto the husking rollers, thus causing it to fall in a lengthwise position on the husking rollers. The fibers of the brush are of considerable depth, thus enabling it to act on ears of different lengths. The husking rollers may be of any suitable character but we have found that when one of the rollers is provided with a surface of yieldable material, such as rubber, the silks will be more completely removed from the ears. We have, therefore, shown the husking roller 39 as comprising a body 44 of solid material, preferably metal, and an outer covering 45, of rubber. The roller 38 is preferably formed of metal and is provided with a spiral groove 46, which serves to keep the rubber roller free from obstructions, such as bits of cob or husk which might lodge in the bite of the rollers and injure the rubber roller. If desired, the metal roller may also have longitudinal corrugations, between the spirals of the groove, to give it a better gripping action on the husks.

The husking mechanism may be operated in any suitable manner but, as here shown, the shaft 23 extends completely across the mechanism and has on that end remote from the pulley 24 a beveled gear 47 which meshes with a corresponding gear 48 on a shaft 49. Secured to the shaft 49 is a gear 50 which is connected through an idler gear 51 with a gear 52 on the shaft of the husking roller 38, and which in turn meshes with a gear 53 on the roller 39. The conveyor 40 comprises a sprocket chain which extends about sprocket wheels 54 and 55, the sprocket wheel 54 being carried by a shaft 56 to which is rigidly secured a spiral gear 57 which meshes with a second spiral gear 58 on the shaft 49. The brush 43 is carried by a horizontal shaft 59 journaled in a bearing bracket 60 and having secured thereto a beveled pinion 61 which meshes with a beveled gear 62 on the shaft 18 which carries the sprocket wheels 16 of the conveyor 8. The ratio of the gears 61 and 62 is such that the brush will be rotated at a relatively high speed so that it will move the upper end of the ear faster than the lower end is being moved and thus throw the same forward onto the husking rollers.

It will be apparent that in the operation of the machine the ears are placed one at a time in an upright position between the flights of the conveyor 8 with their butt ends resting upon the gaging rollers 5 and 6. The movement of the gaging rollers and of the conveyor carries the ears forward into contact with the cutter, which removes the butt, and as the ear is carried past the cutter it is engaged by the husking loosening device 29 which tears the outer husks loose. The ear is carried past the cutter by the conveyor 8 but before it is discharged it will be engaged by a flight of the husking conveyor 40 which will carry it from the butt removing device to the husking rollers, and as it is advanced onto the husking rollers the brush 43 will engage the upper end thereof and tilt the ear forwardly so as to throw it onto the husking rollers with the tip foremost, in which position the ear will lie between two of the flights of the husking conveyor 40 and will be carried along the husking rollers thereby.

The gaging device may take various forms and may comprise either one or two rollers. In Figs. 5 to 8 I have shown two modifications of the gaging device and in that form shown in Figs. 5 and 6 the device comprises a spiral roller 63, corresponding to the roller 6 of Fig. 1, and a smooth roller 64 which has been substituted for the spiral roller 5 of Fig. 1. In Figs. 7 and 8, the device comprises a spiral roller 65 and a fixed bar 66 which is curved to provide a round edge to engage the butt of the ear and which is arranged adjacent to the spiral roller 65. In both of these modified forms of gaging device the stem of the ear will enter between the spiral roller and its cooperating gaging member and will be definitely positioned with relation to the butt removing device and will be moved toward the butt removing device by the action of the spiral roller.

While we have shown and described certain embodiments of our invention we wish it to be understood that we do not desire to be limited to the details thereof as various modifications may occur to a person skilled in the art.

Having now fully described our invention, what we claim as new and desire to secure by Letters Patent, is:

1. In a combined butt removing and husking mechanism comprising a gaging device, a butt removing device adjacent to said gaging device and a pair of husking rollers arranged beyond said butt removing device to receive the ears of corn after the butts have been removed therefrom, an endless conveyor arranged parallel with said gaging device and having flights to engage the individual ears and move the same along said gaging device and past said butt removing device, and a second endless conveyor arranged parallel with said husking rollers and having flights each adapted to extend between adjacent flights of the first mentioned conveyor and to engage an ear of corn as it is discharged from said first mentioned conveyor and move said ear along said husking rollers.

2. In a combined butt removing and husking mechanism comprising a gaging device, a butt removing device adjacent to said gaging device and a pair of husking rollers arranged beyond said butt removing device to receive the ears of corn after the butts have been removed therefrom, an endless conveyor arranged parallel with said gaging device and having flights to engage the individual ears and move the same along said gaging device and past said butt removing device, a second endless conveyor arranged parallel with said husking rollers and having flights each adapted to extend between adjacent flights of the first mentioned conveyor and to engage an ear of corn as it is discharged from said first mentioned conveyor and move said ear along said husking rollers, and means to engage said ears as they are discharged from said first mentioned conveyor to cause them to assume positions on said husking rollers with their tips foremost.

3. In a combined butt removing and husking mechanism comprising a pair of gaging members arranged in a substantially horizontal plane, a butt removing device arranged near the discharge ends of said gaging members, and a pair of husking rollers arranged beyond said butt removing device, an endless conveyor having flights arranged above said gaging members to move ears of corn in an upright position past said butt removing device, a second endless conveyor having flights arranged above said husking rollers to move ears of corn lengthwise of said rollers, said second conveyor being so positioned that the flights thereof will intermesh with the flights of the first mentioned conveyor and engage the ears as they are discharged from said first mentioned conveyor.

4. In a combined butt removing and husking mechanism comprising a pair of gaging members arranged in a substantially horizontal plane, a butt removing device arranged near the discharge ends of said gaging members, and a pair of husking rollers arranged beyond said butt removing device, an endless conveyor having flights arranged above said gaging members to move ears of corn in an upright position past said butt removing device, a second endless conveyor having flights arranged above said husking rollers to move ears of corn lengthwise of said roller, said second conveyor being so positioned that the flights thereof will intermesh with the flights of the first mentioned conveyor and engage the ears as they are discharged from said first mentioned conveyor; and a device mounted above said first mentioned conveyor near the discharge end thereof to engage the upper ends of the ears and throw the same forwardly onto said husking rollers.

5. In a combined butt removing and husking mechanism comprising a pair of gaging members arranged in a substantially horizontal plane, a butt removing device arranged near the discharge ends of said gaging members, and a pair of husking rollers arranged beyond said butt removing device, an endless conveyor having flights arranged above said gaging members to move ears of corn in an upright position past said butt removing device, a second endless conveyor having flights arranged above said husking rollers to move ears of corn lengthwise of said roller, said second conveyor being so positioned that the flights thereof will intermesh with the flights of the first mentioned conveyor and engage the ears as they are discharged from said first mentioned conveyor, and a brush rotatably mounted above said first mentioned conveyor near the discharge end thereof to engage the upper ends of the ears and throw the same forwardly onto said husking rollers.

6. In a mechanism of the character described, a pair of gaging members one of which is in the form of a spiral roller, said roller being mounted for movement toward and from the other member, yieldable means to resist the movement of said roller away from said other member, a butt removing device adjacent to said gaging members, a pair of husking rollers arranged beyond said butt removing device to receive the ears of corn after the butts have been removed therefrom, an endless conveyor having laterally extending flights to move the ears along said gaging members past said butt removing device, a second endless conveyor having laterally extending flights arranged to intermesh with the flights of the first mentioned conveyor and to engage the ears as they are discharged from the first mentioned conveyor and move the same along said husking rollers.

In testimony whereof, we affix our signatures hereto.

WILLIAM W. MORRAL.
SAMUEL E. MORRAL.